United States Patent
Ioka (10) Patent No.: US 11,387,483 B2
(45) Date of Patent: Jul. 12, 2022

(54) NONAQUEOUS ELECTROLYTE ENERGY STORAGE DEVICE AND METHOD FOR PRODUCING SAME

(71) Applicant: GS Yuasa International Ltd., Kyoto (JP)

(72) Inventor: Hirotsugu Ioka, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 0 days.

(21) Appl. No.: 16/486,986

(22) PCT Filed: Feb. 16, 2018

(86) PCT No.: PCT/JP2018/005368
§ 371 (c)(1),
(2) Date: Aug. 19, 2019

(87) PCT Pub. No.: WO2018/155314
PCT Pub. Date: Aug. 30, 2018

(65) Prior Publication Data
US 2020/0020971 A1 Jan. 16, 2020

(30) Foreign Application Priority Data
Feb. 24, 2017 (JP) .............................. JP2017-033129

(51) Int. Cl.
*H01M 10/052* (2010.01)
*H01G 11/24* (2013.01)
*H01M 4/131* (2010.01)
*H01M 4/66* (2006.01)
*H01M 4/04* (2006.01)
(Continued)

(52) U.S. Cl.
CPC .......... *H01M 10/052* (2013.01); *H01G 11/24* (2013.01); *H01M 4/04* (2013.01);
(Continued)

(58) Field of Classification Search
None
See application file for complete search history.

(56) References Cited

U.S. PATENT DOCUMENTS

2005/0220700 A1* 10/2005 Suhara ................. H01M 4/525
423/594.4
2007/0281214 A1 12/2007 Saruwatari et al.
(Continued)

FOREIGN PATENT DOCUMENTS

JP 2008150651 A 7/2008
JP 2009048876 A 3/2009
(Continued)

OTHER PUBLICATIONS

International Search Report dated Apr. 10, 2018 filed in PCT/JP2018/005368.
(Continued)

*Primary Examiner* — Ula C Ruddock
*Assistant Examiner* — Anna Korovina
(74) *Attorney, Agent, or Firm* — Rankin, Hill & Clark LLP (57) ABSTRACT

A nonaqueous electrolyte energy storage device according to one aspect of the present invention is a nonaqueous electrolyte energy storage device including a positive electrode which has a conductive substrate and a positive electrode composite layer layered on the substrate, wherein the substrate is made from an aluminum alloy containing an element other than aluminum at a content of 1% by mass or more, and the positive electrode composite layer contains particles A and particles B having different particle sizes from each other as positive active materials.

9 Claims, 1 Drawing Sheet

(51) Int. Cl.
*H01G 11/06* (2013.01)
*H01M 4/02* (2006.01)
*H01M 4/134* (2010.01)
*H01M 4/36* (2006.01)

(52) U.S. Cl.
CPC .......... *H01M 4/131* (2013.01); *H01M 4/134* (2013.01); *H01M 4/366* (2013.01); *H01M 4/662* (2013.01); *H01G 11/06* (2013.01); *H01M 2004/021* (2013.01); *H01M 2004/027* (2013.01); *H01M 2004/028* (2013.01)

(56) References Cited

U.S. PATENT DOCUMENTS

| | | |
|---|---|---|
| 2008/0102369 A1 | 5/2008 | Sakata |
| 2015/0188145 A1* | 7/2015 | Furutani .................. C22F 1/04 429/245 |

FOREIGN PATENT DOCUMENTS

| | | |
|---|---|---|
| JP | 2009064560 A | 3/2009 |
| JP | 2012094345 A | 5/2012 |
| JP | 2013020975 A | 1/2013 |
| JP | 2013201150 A | 10/2013 |
| JP | 2014047367 A | 3/2014 |
| JP | 2014107125 A | 6/2014 |
| JP | 2015037068 A | 2/2015 |
| WO | 2014103558 A1 | 7/2014 |

OTHER PUBLICATIONS

Extended European Search Report (EESR) dated Nov. 22, 2019 issued in the corresponding European patent application No. 18757-048.6.

* cited by examiner

NONAQUEOUS ELECTROLYTE ENERGY STORAGE DEVICE AND METHOD FOR PRODUCING SAME

TECHNICAL FIELD

The present invention relates to a nonaqueous electrolyte energy storage device and a method for producing the nonaqueous electrolyte energy storage device.

BACKGROUND ART

A nonaqueous electrolyte secondary battery typified by a lithium ion secondary battery has a high energy density and therefore has been used frequently in electronic devices such as a personal computer and a communication terminal, automobiles and the like. The nonaqueous electrolyte secondary battery is generally provided with an electrode assembly which has a pair of electrodes that are electrically separated from each other with a separator interposed therebetween and a nonaqueous electrolyte which is interposed between the electrodes. The charge and discharge of the nonaqueous electrolyte secondary battery can be achieved through the transfer (donation and acceptance) of ions between the electrodes. As the energy storage device other than a secondary battery, a capacitor such as a lithium ion capacitor and an electric double layer capacitor has been widely used.

As the positive electrode for the energy storage device, a layered body composed of a conductive substrate and a positive electrode composite layer layered on the substrate and containing a positive active material has been widely used. As the substrate for the positive electrode, an aluminum foil has been commonly used. On the other hand, for the purpose of, for example, increasing the capacity of the energy storage device, the thickness of the substrate has been decreased. In these situations, a secondary battery and the like have been developed, in which an aluminum alloy is used as a substrate having sufficient strength or the like which can meet the decrease in the thickness of the substrate (see Patent Documents 1 and 2).

PRIOR ART DOCUMENTS

Patent Documents

Patent Document 1: JP-A-2014-47367
Patent Document 2: JP-A-2009-48876

SUMMARY OF THE INVENTION

Problems to be Solved by the Invention

However, when an aluminum alloy is used as a positive electrode substrate, there is such a disadvantage that the resistance associated with repeated charge-discharge cycles increases compared with the case where pure aluminum is used.

The present invention has been made in view of these situations, and an object of the present invention is to provide: a nonaqueous electrolyte energy storage device whereby it becomes possible to reduce the increase in resistance associated with repeated charge-discharge cycles; and a method for producing the nonaqueous electrolyte energy storage device.

Means for Solving the Problems

A nonaqueous electrolyte energy storage device according to one aspect of the present invention which has been made for solving the above-mentioned problems is a nonaqueous electrolyte energy storage device including a positive electrode having a conductive substrate and a positive electrode composite layer layered on the substrate, wherein: the substrate is made from an aluminum alloy containing an element other than aluminum at a content of 1% by mass or more, the positive electrode composite layer contains particles A and particles B having different particle sizes from each other as positive active materials.

A method for producing a nonaqueous electrolyte energy storage device according to another aspect of the present invention is a method for producing a nonaqueous electrolyte energy storage device, including mixing particles A and particles B, which have different particle sizes from each other, with each other as positive active materials to produce a positive electrode composite; and layering the positive electrode composite on a conductive substrate, wherein the substrate is made from an aluminum alloy containing an element other than aluminum at a content of 1% by mass or more.

Advantages of the Invention

According to the present invention, there are provided: a nonaqueous electrolyte energy storage device whereby it becomes possible to reduce the increase in resistance associated with repeated charge-discharge cycles; and a method for producing the nonaqueous electrolyte energy storage device.

MODE FOR CARRYING OUT THE INVENTION

One aspect of the present invention is a nonaqueous electrolyte energy storage device (also simply referred to as a "energy storage device", hereinafter) including a positive electrode having a conductive substrate and a positive electrode composite layer layered on the substrate, wherein: the substrate is made from an aluminum alloy containing an element other than aluminum at a content of 1% by mass or more, and the positive electrode composite layer contains particles A and particles B having different particle sizes from each other as positive active materials.

According to the energy storage device, it becomes possible to reduce the increase in resistance associated with repeated charge-discharge cycles. The reason for this is not found clearly, but it is assumed as follows. Generally in an energy storage device, particles that serve as a positive active material are expanded and shrunk repeatedly in association with the charge and discharge of the energy storage device. Due to the repeated expansion and shrinkage of the particles, the particles leave the substrate. As a result, the adhesiveness between a positive electrode composite layer containing the particles and a substrate is deteriorated, leading to the increase in resistance. Particularly in the case where a hard aluminum alloy is used as the substrate, the particles leave the substrate more significantly. This is probably because, in the case where the substrate is hard, the particles can hardly expand in both of a direction parallel with the surface of the substrate and a downward direction (i.e., a direction toward the substrate) during the expansion of the particles, and consequently the particles can be put in an upward direction (i.e., a direction apart from the substrate) easily. On the other hand, in the case where the substrate is relatively soft like pure aluminum, the substrate may be deformed along the form of the expanded particles and therefore the adhesiveness can be secured. In the case where the substrate is an aluminum alloy, it is assumed that the following effects (1) and (2) can be achieved and the adhesiveness can be improved by mixing two kinds of particles, i.e., larger particles and smaller particles, in the positive electrode composite layer. (1) The smaller particles, which are present among the larger particles and can move relatively easily, can act as a cushion, and consequently the expansion of the large particles in the direction toward the surface of the substrate can occur easily and the larger particles are prevented from leaving from the substrate. (2) Although some of the smaller particles, which are present among the larger particles, act in a direction to which the smaller particles are put against the substrate particularly as the result of the expansion of the larger particles, the adhesiveness between the smaller particles and the substrate can be improved because the substrate is hardly deformed. It is assumed that the adhesiveness of the particles to the substrate can be improved in this manner and, therefore, the increase in resistance can be reduced.

The term "particle size" refers to a particle size (mode diameter) corresponding to a mode value in a volume-based particle size distribution. The wording "containing particles A and particles B having different particle sizes from each other" means that both of a peak corresponding to the particles A and a peak corresponding to the particles B appear in a volume-based particle size distribution curve which is expressed in a frequency distribution. A particle size corresponding to a peak corresponding to particles is defined as a particle size of the particles. The particle size (particle size distribution) is defined as a value measured by a laser diffraction-type particle size distribution measurement.

A specific method for measuring the particle size is as follows. The particle size of the positive active material particle is determined by measuring the particle size distribution of the positive active material particles using a laser diffraction-type particle size distribution measurement device ("SALD2200" (manufactured by Shimadzu Corporation), a measurement control software is WingSALD-2200). For the measurement, a scatter-type measurement mode is employed. A dispersion in which the positive active material particles are dispersed in a dispersion solvent is prepared, and the dispersion is used as a measurement sample. A wet-mode cell for measurement use in which the dispersion is placed is placed under an ultrasonic environment for five minutes, and then the cell is set in the device, and then the measurement is performed by irradiation with a laser beam to obtain a scattered light distribution. The scattered light distribution is approximated by a log-normal distribution. The particle size (mode diameter) corresponding to the mode value is determined within a range in the frequency distribution graph (i.e., a graph in which the particle size is put on the transverse axis and the frequency is put on the longitudinal axis) in which the smallest value is set to 0.1 μm and the largest value is set to 100 μm. When a maximum point corresponding to the particles A and a maximum point corresponding to the particles B appear in the frequency distribution graph, it is determined that the positive electrode composite layer "contains particles A and particles B having different particle sizes from each other". The particle sizes (mode diameters) corresponding to the maximum points are defined as the particle size of the particles A and the particle size of the particles B, respectively.

It is preferred that the particle size ratio (A/B) of the particle size of the particle sizes A to that of the particles B is 3 or more. When the particle size ratio (A/B) is 3 or more, the increase in resistance associated with repeated charge-discharge cycles can be further reduced due to the optimization of the state of packing of the particles in the positive electrode composite layer and the like.

It is preferred that the tensile strength at break of the substrate is 250 MPa or more. When the substrate has high strength like this, the effect to reduce the increase in resistance due to the use of the particles A and the particles B having different particle sizes from each other can be achieved further effectively. The tensile strength at break of the substrate can be defined as a measurement value which is determined by collecting a No. 5 specimen from an aluminum alloy foil and then measuring the tensile strength of the specimen in accordance with the tensile test described in JISZ2241:2011.

It is preferred that the particle size of the particles A is larger than that of the particles B and the amount of the particle A relative to the total amount of the particles A and the particles B is 60 to 90% by mass inclusive. When the amount of the particles A relative to the total amount of the particles A and the particles B falls within the above-mentioned range, in other words, when the mass ratio of the particles A to the particles B falls within a specified range, the increase in resistance associated with repeated charge-discharge cycles can be further reduced due to the optimization of the state of packing of the particles in the positive electrode composite layer and the like.

One aspect of the present invention is a method for producing a nonaqueous electrolyte energy storage device, including: mixing particles A and particles B, which have different particle sizes from each other, with each other as positive active materials to produce a positive electrode composite; and layering the positive electrode composite on a conductive substrate, wherein the substrate is made from an aluminum alloy containing an element other than aluminum at a content of 1% by mass or more. According to the production method, it becomes possible to produce a nonaqueous electrolyte energy storage device whereby it becomes possible to reduce the increase in resistance associated with repeated charge-discharge cycles.

<Nonaqueous Electrolyte Energy Storage Device>

An energy storage device according to one embodiment of the present invention includes a positive electrode, a negative electrode and a nonaqueous electrolyte. Hereinbelow, as one example of the energy storage device, a secondary battery will be described. In general, the positive electrode and the negative electrode together form an electrode assembly that is layered or wounded with a separator interposed therebetween. The electrode assembly is housed in a case, and the nonaqueous electrolyte is filled in the case. The nonaqueous electrolyte is arranged between the positive electrode and the negative electrode. As the case, a known aluminum case that has been commonly used as a case for secondary batteries, or the like can be used.

(Positive Electrode)

The positive electrode has a conductive substrate and a positive electrode composite layer that is layered on the substrate directly or with an intermediate layer interposed therebetween.

(Positive Electrode Substrate)

The substrate (positive electrode substrate) has electrical conductivity, and is made from an aluminum alloy containing an element other than aluminum at a content of 1% by mass or more. In the energy storage device, when the aluminum alloy is used as the positive electrode substrate, it becomes possible, for example, to increase the strength, to reduce the thickness of the positive electrode substrate, and to increase the capacity. As the positive electrode substrate, an aluminum alloy foil can be used. In the description, the wording "having '(electrical) conductivity'" means that the volume resistance rate measured in accordance with JIS-H-0505 (1975) is $10^7 \Omega \cdot cm$ or less, and the term "(electrically) nonconductive" means that the volume resistance rate is more than $10^7 \Omega \cdot cm$.

Examples of the element other than aluminum which is to be contained in the substrate include Mn (manganese), Mg (magnesium), Fe (iron), Cu (copper) and Si (silicon). It is preferred that at least one of Mn and Mg is contained, and it is more preferred that Mn is contained. The upper limit of the amount of the element other than aluminum which is to be contained in the substrate is, for example, 3% by mass.

Examples of the aluminum alloy include Al—Mn-based alloys such as those alloys having alloy Nos. 2024, 3003, 3004, 5052 and 5154 which is prescribed in JIS-H-4000 (2014). Among these alloys, an aluminum alloy having alloy No. 3003 (A3003P) is preferred.

The lower limit of the tensile strength at break of the substrate is preferably 250 MPa, more preferably 260 MPa, still more preferably 270 MPa, particularly preferably 280 MPa. When the substrate having high tensile strength at break is used in combination with the particles A and the particles B having different particle sizes from each other, the effect to reduce the increase in resistance can be exhibited more effectively. This is because, when the smaller particles present in the vicinity of the aluminum foil are put against the aluminum foil by the expansion and shrinkage of the larger particles, the adhesiveness to the substrate increases with the increase in the strength of the aluminum foil. The upper limit of the tensile strength at break is not particularly limited, and is, for example, 350 MPa, and is preferably 300 MPa.

The average thickness of the substrate is not particularly limited, and the lower limit of the average thickness is preferably 10 μm, more preferably 12 μm, still more preferably 15 μm. The upper limit of the average thickness is preferably, for example, 30 μm, more preferably 20 μm. When the average thickness of the substrate falls within the above-mentioned range, it becomes possible to secure sufficient strength, low resistance and the like of the substrate while achieving the reduction in thickness of the substrate.

(Positive Electrode Composite Layer)

The positive electrode composite layer is made from a so-called positive electrode composite that contains a positive active material. The positive electrode composite that forms the positive electrode composite layer may contain an arbitrary component such as a conductive agent, a binder, a thickener and a filler, as required.

The positive electrode composite layer contains particles A and particles B having different particle sizes from each other as a positive active material. Hereinbelow, the case where the particle size of the particles A is larger than that of the particles B will be described. The lower limit of the particle size ratio (A/B) of the particle size of the particles A to that of the particles B is more than 1, preferably 3, more preferably 4, still more preferably 4.5, particularly preferably 4.86. The upper limit of the particle size ratio (A/B) is, for example, 10, preferably 8, more preferably 6, still more preferably 5.5. When the particle size ratio falls within the above-mentioned range, the state of packing of the larger particles A and the smaller particles B can be optimized, the cushioning property of the smaller particles B and the adhesiveness of the smaller particles B to the substrate can be improved, and the increase in resistance associated with repeated charge-discharge cycles can be further reduced. It is considered that, in such a state that the particles A are packed most closely and the particles B are regularly arranged in gaps among the particles A, the distances between the particles A and the particles B become closest and the effect to increase the adhesiveness in association with the expansion and shrinkage becomes maximum. When it is assumed that the particles A and the particles B are truly spherical, the A/B value becomes nearly equal to 4.45 (A/B≈4.45). However, the particles actually have nonspherical particle forms. Therefore, it is preferred to adjust the A/B value to a value falling within the above-mentioned range.

The upper limit of the particle size of the particles A is, for example, preferably 50 μm, more preferably 20 μm. The lower limit of the particle size of the particles A is preferably 5 μm, more preferably 10 μm. The upper limit of the particle size of the particles B is preferably 10 μm, more preferably 5 μm. The lower limit of the particle size of the particles B is preferably 1 μm, more preferably 2 μm.

The mass ratio (A:B) of the particles A to the particles B is not particularly limited. The amount of the particles A relative to the total amount of the particles A and the particles B is preferably 60% by mass (A:B=6:4) or more, more preferably 65% by mass (A:B=6.5:3.5) or more. The amount of the particles A relative to the total amount of the particles A and the particles B is preferably 90% by mass (A:B=9:1) or less, more preferably 80% by mass (A:B=8:2) or less. When this mixing ratio is achieved, unnecessary contact between the particles B or between the particles A can be prevented. As a result, the state of packing of the particles A and the particles B can be optimized, the cushioning property of the particles B and the adhesiveness of the particles B to the substrate can be improved, and the increase in resistance associated with repeated charge-discharge cycles can be further reduced.

As the positive active material to be contained in the positive electrode composite layer, a positive active material other than the particles A and the particles B (e.g., particles C) may be contained. The total amount of the particles A and the particles B relative to the total amount of all of the positive active materials is preferably 60% by mass or more, more preferably 90% by mass or more, still more preferably 95% by mass or more, particularly preferably 99% by mass or more. When the content ratio of the particles A and the particles B in the total amount of all of the positive active materials is increased, the effect caused as the result of the use of the particles A in combination with the particles B can be further enhanced.

The positive active material is not particularly limited. Examples of the positive active material include: a complex oxide represented by the formula $Li_xMO_y$ (wherein M represents at least one transition metal) (e.g., $Li_xCoO_2$, $Li_xNiO_2$, $Li_xMnO_3$, $Li_xNi_aCo_{(1-a)}O_2$ and $Li_xNi_aMn_sCo_{(1-a-s)}O_2$ each having a layered α-NaFeO$_2$-type crystal structure, and $Li_xMn_2O_4$ and $Li_xNi_aMn_{(2-a)}O_4$ each having a spineltype crystal structure); and a polyanion compound represented by $Li_wMe(XO_y)_z$ (wherein Me represents at least one transition metal; and X represents, for example, P, Si, B, V or the like) (e.g., $LiFePO_4$, $LiMnPO_4$, $LiNiPO_4$, $LiCoPO_4$, $Li_3V_2(PO_4)_3$, $Li_2MnSiO_4$ and $Li_2CoPO_4F$). Some of the elements or polyanions in each of these compounds may be partially substituted by another elements or anion species. In the positive electrode composite layer, only one of these compounds may be used, or two or more of these compounds may be used in a mixed state. The positive active materials form the particles A and the particles B.

The positive active material is preferably a composite metal oxide containing Ni, Mn and Co, such as the above-mentioned $Li_xNi_aMn_sCo_{(1-\alpha-\beta)}O_2$ (wherein x represents a numerical number of 0.8 to 1.3 inclusive; and α and β independently represent an integer of 0 to 1 exclusive). It is particularly preferred that each of the particles A and the particles B are made from a composite metal oxide containing Ni, Mn and Co.

An energy storage device in which a lithium transition metal composite oxide is used as the positive active material is preferred, because the balance among energy density, charge-discharge characteristics and life characteristics including high-temperature storage characteristics is excellent. It is also preferred that the ratio of the number of moles of nickel to the number of moles of a transition metal is larger. This is because the expansion/shrinkage of the active material during a charge-discharge procedure becomes larger, and, as a result, the resistance of the positive electrode may increase with the increase in the number of charge-discharge cycles and the effect of the present invention can be achieved more significantly. The ratio of the number of moles of nickel to the number of moles of a transition metal in the lithium transition metal composite oxide is preferably more than 30%, more preferably 33% or more. If the ratio of the number of moles of nickel to the number of moles of the transition metal in the lithium transition metal composite oxide is more than 80%, the initial coulombic efficiency of the lithium transition metal composite oxide may decrease. From these viewpoints, the ratio of the number of moles of nickel to the number of moles of the transition metal in the lithium transition metal composite oxide is preferably more than 30%, more preferably 33% or more, particularly preferably 33% to 80% inclusive. It is most preferred to use a lithium transition metal composite oxide represented by the formula $Li_wNi_xCo_yMn_{1-x-y}O_2$ (0<w≤1.2, 0.3<x≤0.8, 0≤y<0.7, wherein x+y≤1) as the positive active material. It is preferred that the formula: 0.1≤y≤0.4 is satisfied, it is more preferred that the formula: 0.1≤1−x−y≤0.4 is satisfied, and it is still more preferred that the formulae: x≥y and x≥1−x−y are satisfied. The ratio among x, y and 1−x−y (i.e., x:y:(1−x−y)) may be substantially 1:1:1. In the lithium transition metal composite oxide represented by the formula: $Li_wNi_xMn_yCo_{1-x-y}O_2$, an element other than Li, Ni, Mn, Co or O may be contained for the purpose of improving or modifying the performance of the lithium transition metal composite oxide.

The positive active material may be broken easily by the variation in volume in association with charge and discharge, and this tendency becomes more significant when a substrate having high strength is used. For these reasons, as the particles A and the particles B having different particle sizes from each other, the composite metal oxide containing Ni, Mn and Co is used. In this case, the smaller particles B which can move relatively easily can act like a cushion so as to prevent the charge-discharge-associated breakage of the positive active material. In this manner, the energy density of the energy storage device can be increased while exhibiting the effects of the present invention.

The lower limit of the amount of the positive active material in the positive electrode composite layer is preferably 80% by mass, more preferably 85% by mass, still more preferably 90% by mass. The upper limit of the amount of the positive active material is preferably 99% by mass, more preferably 95% by mass. When the amount of the positive active material falls within the above-mentioned range, it becomes possible, for example, to increase the electric capacity of the energy storage device.

The conductive agent is not particularly limited, as long as the performance of the energy storage device cannot be adversely affected. Examples of the conductive agent include natural or artificial graphite, carbon black such as furnace black, acetylene black and ketjen black, a metal, and a conductive ceramic. Examples of the form of the conductive agent include a powdery form and a fibrous form.

Examples of the binder include: a thermoplastic resin such as a fluororesin (e.g., polytetrafluoroethylene (PTFE), poly(vinylidene fluoride) (PVDF), poly(vinylidene fluoride-co-hexafluoropropylene), polytetrafluoroethylene (PTFE), tetrafluoroethylene-hexafluoropropene copolymer), polyethylene, polypropylene and polyimide; an elastomer such as ethylene-propylene-diene rubber (EPDM), sulfonated EPDM, styrene-butadiene rubber (SBR) and a fluororubber; and a polysaccharide polymer.

As the thickener, a polysaccharide polymer such as carboxymethyl cellulose (CMC) and methyl cellulose can be mentioned. In the case where the thickener has a functional group capable of reacting with lithium, it is preferred to deactivate the functional group by methylation or the like in advance.

The filler is not particularly limited, as long as the performance of the energy storage device cannot be adversely affected. Examples of the main component of the filler include a polyolefin (e.g., polypropylene and polyethylene), silica, alumina, zeolite, glass and carbon.

The upper limit of the porosity of the positive electrode composite layer is preferably 35 vol %, more preferably 28 vol %, still more preferably 26 vol %. When the porosity of the positive electrode composite layer is adjusted to this relatively small value, it becomes possible, for example, to improve the adhesiveness between the positive electrode composite layer and the substrate and to reduce the increase in resistance more effectively. The lower limit of the porosity may be, for example, 20 vol %, and may also be 24 vol %.

The density of the positive electrode is not particularly limited. The lower limit of the density may be 2 $g/cm^3$, preferably 3 $g/cm^3$, more preferably 3.2 $g/cm^3$. When the density of the positive electrode is adjusted to a relatively large value, it becomes possible, for example, to improve the adhesiveness between the positive electrode composite layer and the substrate and to reduce the increase in resistance more effectively. The upper limit of the density is preferably 4 $g/cm^3$, more preferably 3.4 $g/cm^3$.

(Negative Electrode)

The negative electrode has a negative electrode substrate and a negative electrode composite layer that is arranged on the negative electrode substrate directly or with an intermediate layer interposed therebetween. The intermediate layer can have the same configuration as that of the intermediate layer used in the positive electrode.

As the material for the negative electrode substrate, a metal such as copper, nickel, a stainless steel and a nickel plated steel, or an alloy of the metal can be used, and copper or a copper alloy can be used preferably. That is, as the negative electrode substrate, a copper foil is preferred. Examples of the copper foil include a rolled copper foil and an electrolytic copper foil.

The negative electrode composite layer is made from a so-called negative electrode composite that contains a negative active material. The negative electrode composite that forms the negative electrode composite layer may contain an arbitrary component, such as a conductive agent, a binder, a thickener and a filler, as required. As the arbitrary component such as a conductive agent, a binder, a thickener and a filler, the same component as the component used as the arbitrary component in the positive electrode composite layer can be used.

As the negative active material, a material capable of storing and releasing a lithium ion is commonly used. Examples of the negative active material include: a metal or a semimetal, such as Si and Sn; a metal oxide or a semimetal oxide, such as Si oxide and Sn oxide; a polyphosphate compound; and a carbon material such as graphite and amorphous carbon (graphitizable carbon or hardly graphitizable carbon).

Furthermore, the negative electrode composite layer may also contain a typical nonmetallic element such as B, N, P, F, Cl, Br and I, a typical metallic element such as Li, Na, Mg, Al, K, Ca, Zn, Ga and Ge, and a transition metal element such as Sc, Ti, V, Cr, Mn, Fe, Co, Ni, Cu, Mo, Zr, Ta, Hf, Nb and W.

(Separator)

The separator can act to separate the positive electrode from the negative electrode and hold the nonaqueous electrolyte. As the material for the separator, a woven fabric, a nonwoven fabric, a porous resin film or the like can be used. Among these materials, a porous resin film is preferred. From the viewpoint of strength, a polyolefin such as polyethylene and polypropylene is used preferably as the main component for the porous resin film. Alternatively, a porous resin film that is a complex of any one of these resins with a resin such as aramid and polyimide may also be used.

(Nonaqueous Electrolyte)

The nonaqueous electrolyte contains a nonaqueous solvent and an electrolyte salt capable of being dissolved in the nonaqueous solvent. The nonaqueous electrolyte may also contain other additives.

As the nonaqueous solvent, a known nonaqueous solvent that has been commonly used as a nonaqueous solvent for a common nonaqueous electrolyte for energy storage devices can be used. Examples of the nonaqueous solvent include a cyclic carbonate, a linear carbonate, an ester, an ether, an amide, a sulfone, a lactone and a nitrile. Among these solvents, at least a cyclic carbonate or a liner carbonate is used preferably, and a combination of a cyclic carbonate and a linear carbonate is used more preferably. In the case where a cyclic carbonate and a liner carbonate are used in combination, the volume ratio between the cyclic carbonate and the linear carbonate ((cyclic carbonate):(linear carbonate)) is not particularly limited, and is preferably, for example, 5:95 to 50:50 inclusive.

Examples of the cyclic carbonate include ethylene carbonate (EC), propylene carbonate (PC), butylene carbonate (BC), vinylene carbonate (VC), vinyl ethylene carbonate (VEC), chloroethylene carbonate, fluoroethylene carbonate (FEC), difluoroethylene carbonate (DFEC), styrene carbonate, catechol carbonate, 1-phenylvinylene carbonate and 1,2-diphenylvinylene carbonate. Among these compounds, EC is preferred.

Examples of the linear carbonate include diethyl carbonate (DEC), dimethyl carbonate (DMC), ethyl methyl carbonate (EMC) and diphenyl carbonate. Among these compounds, EMC is preferred.

As the electrolyte salt, a known electrolyte salt that has been commonly used as an electrolyte salt for a common nonaqueous electrolyte for common energy storage devices can be used. As the electrolyte salt, a lithium salt, a sodium salt, a potassium salt, a magnesium salt and an onium salt can be mentioned, and a lithium salt is preferred.

Examples of the lithium salt include: an inorganic lithium salt such as $LiPF_6$, $LiPO_2F_2$, $LiBF_4$, $LiClO_4$ and $LiN(SO_2F)_2$; and a lithium salt having a fluorohydrocarbon group, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ and $LiC(SO_2C_2F_5)_3$. Among these compounds, an inorganic lithium salt is preferred.

The lower limit of the content of the electrolyte salt in the nonaqueous electrolyte is preferably 0.1 M, more preferably 0.3 M, still more preferably 0.5 M, particularly preferably 0.7 M. The upper limit of the content is not particularly limited, and is preferably 2.5 M, more preferably 2 M, still more preferably 1.5 M.

<Method for Producing Nonaqueous Electrolyte Energy Storage Device>

A method for producing the energy storage device according to one embodiment of the present invention includes:

(1) mixing particles A and particles B, which have different particle sizes from each other, with each other as positive active materials to produce a positive electrode composite; and (2) layering the positive electrode composite on a conductive substrate, wherein the substrate is made from an aluminum alloy containing an element other than aluminum at a content of 1% by mass or more.

In step (1), the particles A and the particles B which serve as positive active materials, are mixed together along with an arbitrary component such as a binder and a dispersion medium as required. Each of the particles A and the particles B are generally particles having a single peak in a volume-based particle size distribution.

In step (2), a positive electrode composite that is mixed in step (1) is layered on a substrate by a known method. After the application of the positive electrode composite, the resultant product is subjected to a drying procedure or the like to produce a positive electrode having the positive electrode composite layer layered on the substrate. After the application and drying of the positive electrode composite, the positive electrode composite layer may be pressed in the thickness direction by a known method. When the positive electrode composite layer is pressed, it becomes possible to improve the adhesiveness between the positive electrode composite layer and the substrate.

Except for the steps (1) and (2), any known technique may be employed for the production of the energy storage device. The production method may include, for example, a step of housing the positive electrode and the negative electrode (i.e., an electrode assembly) in a case and a step of injecting the nonaqueous electrolyte into the case.

OTHER EMBODIMENTS

The present invention is not limited to the above-mentioned embodiments. In addition to the aspects, the present invention can be made in aspects having various modifications and improvements. In the above-mentioned embodiments, the invention is described mainly about cases in which the energy storage device is a secondary battery. However, the energy storage device may be another type of energy storage device. An example of another type of energy storage device is a capacitor (an electric double layer capacitor, a lithium ion capacitor).

Figure 1:
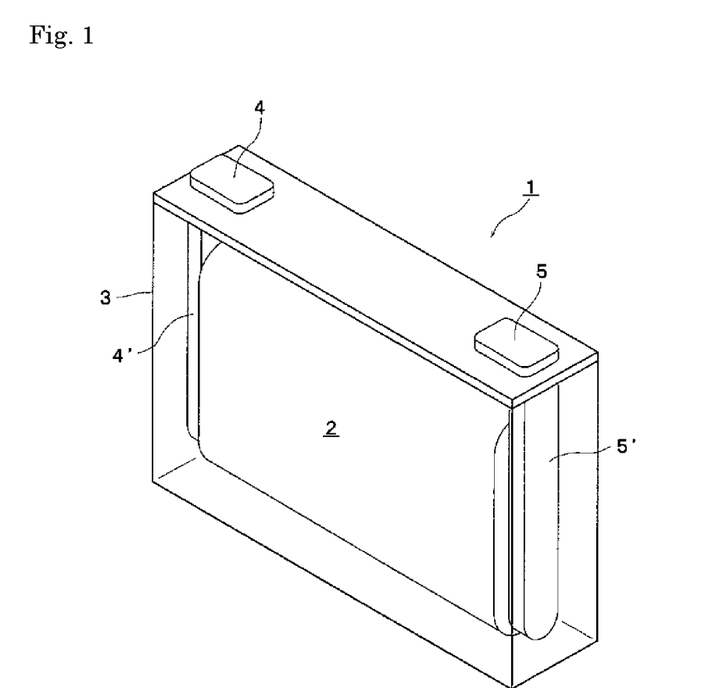
FIG. 1 is an external perspective view illustrating a nonaqueous electrolyte secondary battery according to one embodiment of the present invention.

FIG. 1 shows the schematic illustration of a rectangular nonaqueous electrolyte secondary battery 1 (secondary battery 1) that is one embodiment of the energy storage device according to the present invention. This drawing is a perspective view of the inside of the case. In the secondary battery 1 shown in FIG. 1, an electrode assembly 2 is housed in a battery case 3. The electrode assembly 2 is formed by winding a positive electrode containing a positive active material and a negative electrode containing a negative active material together with a separator interposed therebetween. The positive electrode is electrically connected to a positive electrode terminal 4 through a positive electrode lead 4', and the negative electrode is electrically connected to a negative electrode terminal 5 through a negative electrode lead 5'. In the inside of the battery case 3, a nonaqueous electrolyte is injected. The specific configurations and the like of the components such as the positive electrode are as mentioned above.

Figure 2:
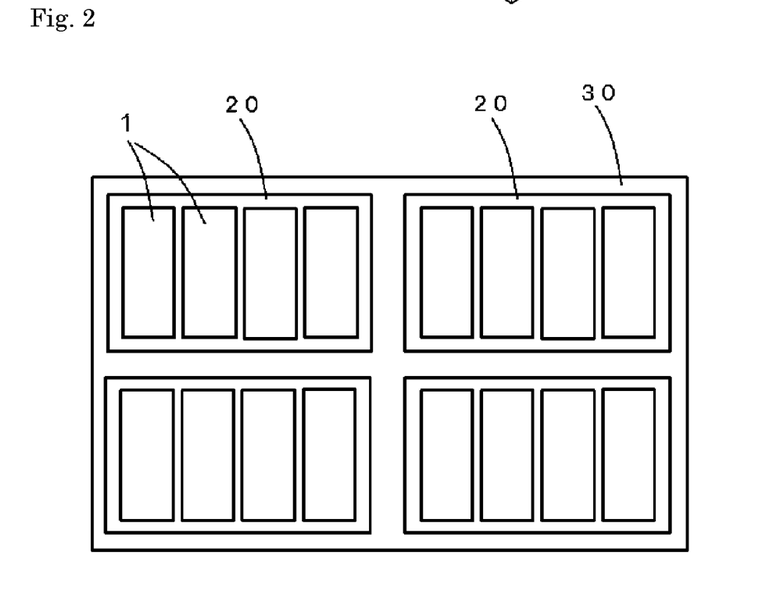
FIG. 2 is a schematic view of an energy storage apparatus in which a plurality of nonaqueous electrolyte secondary batteries according to one embodiment the present invention are assembled.

The configuration of the energy storage device according to the present invention is not particularly limited, and examples of the configuration include a cylindrical battery, a square (rectangular) battery and a flat battery. The present invention may be made in the form of an energy storage apparatus provided with a plurality of the energy storage devices. One embodiment of the energy storage apparatus is shown in FIG. 2. In FIG. 2, an energy storage apparatus 30 includes a plurality of energy storage units 20. Each of the energy storage units 20 includes a plurality of secondary batteries 1. The energy storage apparatus 30 can be mounted as a power supply for an automobile such as an electric vehicle (EV), a hybrid electric vehicle (HEV) and a plug-in hybrid electric vehicle (PHEV).

EXAMPLES

Hereinbelow, the present invention will be described in more detail by way of examples. However, the present invention is not limited by the examples mentioned below.

Aluminum foils and aluminum alloy foils used in Examples and Comparative Examples are mentioned below. In the measurement of tensile strength at break, Autograph AG-Xplus manufactured by Shimadzu Corporation was used.

Al alloy foil 1: an aluminum alloy foil having an average thickness of 15 µm and tensile strength at break of 282.5 MPa (JISA3003P: aluminum content: 98% by mass)

Al alloy foil 2: an aluminum alloy foil having an average thickness of 15 µm and tensile strength at break of 298.7 MPa (aluminum content: 98.6% by mass, iron content: 1.1% by mass)

Al alloy foil 3: an aluminum alloy foil having an average thickness of 12 µm and tensile strength at break of 236.5 MPa (aluminum content: 98.5% by mass, iron content: 1.2% by mass)

Pure Al foil: a pure aluminum foil having an average thickness of 15 µm and tensile strength at break of 209.0 MPa (JIS A1085P)

Example 1

(Positive Electrode)

As positive active materials, particles A of $LiNi_{1/3}Co_{1/3}Mn_{1/3}O_2$ (particle size: 10.2 µm) and particles B of $LiNi_{1/3}Co_{1/3}Mn_{1/3}O_2$ (particle size: 2.1 µm) were used at a mass ratio of 7:3. The (A/B) ratio of the particle size of the particles A to that of the particles B was 4.86. The positive active materials, acetylene black (AB) that served as a conductive agent, poly(vinylidene fluoride) (PVDF) that served as a binder and N-methylpyrrolidone (NMP) that served as a nonaqueous solvent were used to prepare a positive electrode composite paste. The mass ratio among the positive active materials, the binder and the conductive agent was 90:5:5 (in terms of solid contents). The positive electrode composite paste was intermittently coated onto both surfaces of an Al alloy foil 1 (thickness: 15 µm) that served as a positive electrode substrate with a positive electrode composite layer-unformed region left on the surfaces, and was then dried to produce positive electrode composite layers. Subsequently, the surfaces of the positive electrode composite layers were roll-pressed to produce a positive electrode. The positive electrode has a thickness of 137 µm and a density of 3.23 g/cm$^3$.

(Negative Electrode)

Graphite that served as a negative active material, styrene-butadiene rubber (SBR) that served as a binder, carboxymethyl cellulose (CMC), and water that served as a solvent were used to prepare a negative electrode composite paste. The mass ratio among graphite, SBR and CMC was 96:2:2. The negative electrode composite paste was prepared by adjusting the amount of water to control a solid content (% by mass) and then subjecting the resultant product to a mixing step using a multi blender. The negative electrode paste was intermittently coated onto both surfaces of a copper foil (thickness: 10 µm) with a negative electrode composite layer-unformed region left on the surfaces, and was then dried to produce a negative electrode composite layer. Subsequently, the resultant product was roll-pressed to produce a negative electrode. The negative electrode has a thickness of 124 µm.

(Nonaqueous Electrolyte)

$LiPF_6$ was dissolved in a solvent, which was prepared by mixing ethylene carbonate with ethyl methyl carbonate so that the content ratio of these components respectively became 30 vol % and 70 vol %, so that the salt concentration in the resultant solution became 1.0 mol/L. In this manner, a nonaqueous electrolyte was prepared. The water content in the nonaqueous electrolyte was adjusted to less than 50 ppm.

(Separator)

As a separator, a polyethylene-made microporous film having a thickness of 21 µm was used.

(Assembly of Battery)

The positive electrode, the negative electrode and the separator were layered together and were then wound. Subsequently, the positive electrode composite layer-unformed region in the positive electrode and the negative electrode composite layer-unformed region in the negative electrode were respectively welded to a positive electrode lead and a negative electrode lead, then a resultant product was packed in a container, then the container and a lid plate were welded together, then a nonaqueous electrolyte was injected into the welded product, and then an opening of the resultant product was sealed. In this manner, a secondary battery of Example 1 was produced.

Examples 2 to 4, Comparative Examples 1 and 2

The same procedure as in Example 1 was carried out, except that each of positive active material ($LiNi_{1/3}Co_{1/3}$ $Mn_{1/3}O_2$) particles respectively having particle sizes shown in Table 1 and each of positive electrode substrates shown in Table 1 were used and the density of the resultant positive electrode was as shown in Table 1. In this manner, secondary batteries of Examples 2 to 4 and Comparative Examples 1 and 2 were produced. The pressing pressure to be applied onto a positive electrode composite layer surface was varied appropriately.

[Evaluation]

(Measurement of Capacity)

Each of the above-produced batteries of Examples 1 to 4 and Comparative Examples 1 and 2 was subjected to a capacity measurement as mentioned below in a thermostatic chamber that was adjusted to 25° C. to confirm whether or not charge-discharge in the same amount of charge as a battery nominal capacity could be achieved. With respect to the conditions for the charge in the measurement of capacity, constant-current/constant-voltage charging was carried out at a current value of 1 CA and a voltage of 4.2 V. The time of charge was three hours after the initiation of the distribution of electricity. With respect to the conditions for discharge, constant-current discharging was carried out at a current of 1 CA and an end of discharge voltage of 2.75 V. Between the charge and the discharge, a 10-minute down time was provided. The above-mentioned current value 1 CA is a current value at which the amount of charge becomes equal to a battery nominal capacity when a battery is subjected to constant-current electricity distribution for one hour.

(Measurement of Alternate Current Resistance Before Cycle Test)

A 10-minute down time was provided for each of the batteries which had been discharged to an end of discharge voltage of 2.75 V, and then the alternate current resistance value (ACR value) was measured using "3560" AC mΩ HiTESTER manufactured by Hioki E. E. Corporation. The measurement was carried out by applying an alternating-current voltage or an alternating current each having a frequency of 1 kHz to each of the batteries.

(High-Temperature Charge-Discharge Cycle Test)

Each of the secondary batteries of Examples 1 to 4 and Comparative Examples 1 and 2 was evaluated in the following manner. Each of the secondary batteries was subjected to charging and discharging, in which constant-current/constant-voltage charging at a charge current of 1 CmA and a charge voltage of 4.2 V and constant-current discharging at a discharge current of 1 CmA and an end of discharge voltage of 2.75 V were repeated, at 60° C. for 500 cycles. The alternate current resistance (ACR) before and after the charge-discharge cycle test was measured. Each of the batteries, which had been discharged to an end of discharge voltage of 2.75 V, was subjected to a 10-minute down time, and then the ACR was measured using "3560" AC mΩ HiTESTER manufactured by Hioki E. E. Corporation. The measurement was carried out by applying an alternating-current voltage or an alternating current each having a frequency of 1 kHz to the battery.

A relative value of the ratio of increase in the measured ACR (i.e., the increase rate of the ACR after the test relative to the ACR before the test) is shown in Table 1. Each of the values shown in Table 1 was a value relative to a value measured in Comparative Example (in which a pure Al foil was used as a substrate) corresponding to the Example. Concretely, with respect to the values of Example 1 and Comparative Example 1, the value of Comparative Example 1 was defined as a standard value (100.0%); and with respect to the values of Examples 2 to 4 and Comparative Example 2, the value of Comparative Example 2 was defined as a standard value (100.0%).

Comparative Example 31

(Positive Electrode)

As positive active materials, $LiNi_{1/3}Co_{1/3}Mn_{1/3}O_2$ having a particle size of 4.0 µm was used. The positive active material, acetylene black (AB) that served as a conductive agent, poly(vinylidene fluoride) (PVDF) that served as a binder and N-methylpyrrolidone (NMP) that served as a nonaqueous solvent were used to prepare a positive electrode composite paste. The mass ratio among the positive active material, the binder and the conductive agent was 90:5:5 (in terms of solid contents). The positive electrode composite paste was intermittently coated onto both surfaces of an Al alloy foil 1 (thickness: 15 µm) that served as a positive electrode substrate with a positive electrode composite layer-unformed region left on the surfaces, and was then dried to produce positive electrode composite layers. Subsequently, the surfaces of the positive electrode composite layers were roll-pressed to produce a positive electrode. The positive electrode has a thickness of 83 µm and a density of 2.93 g/cm$^3$.

(Negative Electrode)

Hardly graphitizable carbon that served as a negative active material, poly(vinylidene fluoride) (PVDF) that served as a binder, and N-methylpyrrolidone (NMP) that served as a solvent were used to prepare a negative electrode composite paste. The mass ratio between the hardly graphitizable carbon and PVDF was 90:10. The negative electrode composite paste was prepared by adjusting the amount of NMP to control the solid content (% by mass) and then subjecting the resultant product to a mixing step using a multi blender. The negative electrode paste was intermittently coated onto both surfaces of a copper foil (thickness: 10 µm) with a negative electrode composite layer-unformed region left on the surfaces, and was then dried to produce a negative electrode composite layer. Subsequently, the resultant product was roll-pressed to produce a negative electrode. The negative electrode has a thickness of 104 µm.

(Assembly of Battery)

A secondary battery of Comparative Example 3 was produced in the same manner as in Example 1, using the above-mentioned positive electrode, the above-mentioned negative electrode and the same nonaqueous electrolyte and the same separator as those used in Example 1.

Comparative Example 4

A secondary battery of Comparative Example 4 was produced in the same manner as in Comparative Example 3, except that a positive electrode substrate shown in Table 1 was used.

[Evaluation]

(Measurement of Capacity)

Each of the above-produced secondary batteries of Comparative Examples 3 and 4 was subjected to a capacity measurement as mentioned below in a thermostatic chamber that was adjusted to 25° C. to confirm whether or not charge-discharge in the same amount of charge as a secondary battery nominal capacity could be achieved. With respect to the conditions for the charging in the measurement of capacity, constant-current/constant-voltage charging was carried out at a current value of 1 CA and a voltage of 4.2 V. The time of charge was three hours after the initiation of the distribution of electricity. With respect to the conditions for discharging, constant-current discharging was carried out at a current of 1 CA and an end of discharge voltage of 2.75 V. Between the charging and the discharging, a 10-minute down time was provided.

(High-Temperature Charge-Discharge Cycle Test)

Each of the secondary batteries of Comparative Examples 3 and 4 was evaluated in the following manner. Each of the secondary batteries was subjected to a charge-discharge cycle, in which the each of the charge current and the discharge current was 2 CmA and the depth of charge (SOC) was 20 to 80%, at 60° C. for 3000 cycles. The alternate current resistance (ACR) before and after the charge-discharge cycle test was measured. Each of the secondary batteries of Comparative Examples 3 and 4 was discharged to an end of discharge voltage of 2.75 V and was then subjected to a 10-minute down time, and then the alternate current resistance value (ACR value) was measured using "3560" AC mΩ HiTESTER manufactured by Hioki E. E. Corporation. The measurement was carried out by applying an alternating-current voltage or an alternating current each having a frequency of 1 kHz to the battery. The measured ACR and a relative value of the ratio of increase in ACR (i.e., the increase rate of the ACR after the test relative to the ACR before the test) are shown in Table 1. Each of the values of Comparative Examples 3 and 4 shown in Table 1 was a value relative to a value measured in the corresponding Comparative Example 4 in which a pure Al foil was used as a substrate (wherein the value of Comparative Example 4 was defined as 100.0%).

Comparative Example 5

(Positive Electrode)

As a positive active material, $LiMn_2O_4$ particles A (particle size: 18 μm) and $LiNi_{1/3}Co_{1/3}Mn_{1/3}O_2$ particles B (particle size: 10 μm) were used at a mass ratio of 7:3. The (A/B) ratio of the particle size of the particles A to that of the particles B was 1.80. The positive active material, acetylene black (AB) that served as a conductive agent, poly(vinylidene fluoride) (PVDF) that served as a binder and N-methylpyrrolidone (NMP) that served as a nonaqueous solvent were used to prepare a positive electrode composite paste. The mass ratio among the positive active material, the binder and the conductive agent was 90:5:5 (in terms of solid contents). The positive electrode composite paste was intermittently coated onto both surfaces of an Al alloy foil 1 (thickness: 15 μm) that served as a positive electrode substrate with a positive electrode composite layer-unformed region left on the surfaces, and was then dried to produce positive electrode composite layers. Subsequently, the surfaces of the positive electrode composite layers were roll-pressed to produce a positive electrode. The positive electrode has a thickness of 186 μm and a density of 2.17 g/cm³.

(Negative Electrode)

Graphite that served as a negative active material, poly(vinylidene fluoride) (PVDF) that served as a binder, and N-methylpyrrolidone (NMP) that served as a solvent were used to prepare a negative electrode composite paste. The mass ratio between graphite and PVDF was 90:10. The negative electrode composite paste was prepared by adjusting the amount of NMP to control the solid content (% by mass) and then subjecting the resultant product to a mixing step using a multi blender. The negative electrode paste was intermittently coated onto both surfaces of a copper foil (thickness: 10 μm) with a negative electrode composite layer-unformed region left on the surfaces, and was then dried to produce a negative electrode composite layer. Subsequently, the resultant product was roll-pressed to produce a negative electrode. The negative electrode has a thickness of 129 μm.

(Assembly of Battery)

A secondary battery of Comparative Example 5 was produced in the same manner as in Example 1, using the same nonaqueous electrolyte and the same separator as those used in Example 1.

Comparative Example 6

A secondary battery of Comparative Example 6 was produced in the same manner as in Comparative Example 5, except that a positive electrode substrate shown in Table 1 was used.

[Evaluation]

(Measurement of Capacity)

Each of the secondary batteries of Comparative Examples 5 and 6 which were produced as mentioned above was subjected to a capacity measurement as mentioned below in a thermostatic chamber that was adjusted to 25° C. to confirm whether or not charge-discharge in the same amount of charge as a secondary battery nominal capacity could be achieved. With respect to the conditions for the charging in the measurement of capacity, constant-current/constant-voltage charging was carried out at a current value of 1 CA and a voltage of 4.1 V The time of charge was three hours after the initiation of the distribution of electricity. With respect to the conditions for discharging, constant-current discharging was carried out at a current of 1 CA and an end of discharge voltage of 2.75 V Between the charging and the discharging, a 10-minute down time was provided.

(Measurement of Alternate Current Resistance Before Cycle Test)

A 10-minute down time was provided for each of the batteries which had been discharged to an end of discharge voltage of 2.75 V, and then the alternate current resistance value (ACR value) was measured using "3560" AC mΩ HiTESTER manufactured by Hioki E. E. Corporation. The measurement was carried out by applying an alternating-current voltage or an alternating current each having a frequency of 1 kHz to each of the batteries.

(High-Temperature Charge-Discharge Cycle Test)

Each of the secondary batteries of Comparative Example 5 and Comparative Examples 6 was evaluated in the following manner. Each of the secondary batteries was subjected to a charge-discharge cycle, in which the each of the charge current and the discharge current was 1 CmA and the depth of charge (SOC) was 0 to 100%, at 45° C. for 1000 cycles. The alternate current resistance (ACR) before and after the charge-discharge cycle test was measured. Each of the secondary batteries of Comparative Example 5 and Comparative Example 6 was discharged to an end of discharge voltage of 2.75 V and was then subjected to a 10-minute down time, and then the alternate current resistance value (ACR value) was measured using "3560" AC mΩ HiTESTER manufactured by Hioki E. E. Corporation. The measurement was carried out by applying an alternating-current voltage or an alternating current each having a frequency of 1 kHz to the battery. The measured ACR before test and a relative value of the ratio of increase in ACR (i.e., the increase rate of the ACR after the test relative to the ACR before the test) are shown in Table 1. Each of the values of Comparative Example 5 and Comparative Example 6 shown in Table 1 was a value relative to a value measured in the corresponding Comparative Example 6 in which a pure Al foil was used as a substrate (wherein the value of Comparative Example 6 was defined as 100.0%).

TABLE 1

|  | Particle size of particles A μm | Particle size of particles B μm | Particle size ratio A/B | Density of positive electrode g/cm³ | Positive electrode substrate | Tensile strength at break M Pa | ACR increase rate vs. Pure Al foil |
|---|---|---|---|---|---|---|---|
| Example 1 | 10.2 | 2.1 | 4.86 | 3.23 | Al alloy foil 1 | 282 | 90.9 |
| Comparative Example 1 | 10.2 | 2.1 | 4.86 | 3.06 | Pure Al foil | 209 | 100.0 |
| Example 2 | 19.1 | 3.6 | 5.31 | 3.32 | Al alloy foil 1 | 282 | 90.5 |
| Example 3 | 19.1 | 3.6 | 5.31 | 3.32 | Al alloy foil 2 | 299 | 88.7 |
| Example 4 | 19.1 | 3.6 | 5.31 | 3.32 | Al alloy foil 3 | 237 | 96.9 |
| Comparative Example 2 | 19.1 | 3.6 | 5.31 | 3.32 | Pure Al foil | 209 | 100.0 |
| Comparative Example 3 | 4.0 | — | 1.00 | 2.93 | Al alloy foil 1 | 282 | 115.1 |
| Comparative Example 4 | 4.0 | — | 1.00 | 2.93 | Pure Al foil | 209 | 100.0 |
| Comparative Example 5 | 18 | 10 | 1.80 | 2.17 | Al alloy foil 1 | 282 | 108.9 |
| Comparative Example 6 | 18 | 10 | 1.80 | 2.17 | Pure Al foil | 209 | 100.0 |

*In each of Comparative Examples 3 and 4, only one kind of particles A were used and therefore the particle size ratio was determined as 1.00.

As shown in Table 1, when compared with Comparative Example 3 and Comparative Example 4 in which only one kind of particles were used, the ACR increase rate was increased by 10% or more by changing the substrate from pure aluminum to an aluminum alloy. In contrast, when two kinds of particles each having different particle sizes from each other were used, the ACR increase rate was reduced compared with the case where only one kind of particles were used. Particularly in the secondary batteries of Examples 1 to 4, it is demonstrated that the ACR increase rate was reduced compared with the case where pure aluminum was used as a substrate.

INDUSTRIAL APPLICABILITY

The present invention can be applied to a nonaqueous electrolyte energy storage device including a nonaqueous electrolyte secondary battery that can be used as a power supply for an electronic device such as a personal computer and a communication terminal, a vehicle and the like.

DESCRIPTION OF REFERENCE SIGNS

1: nonaqueous electrolyte secondary battery
2: electrode assembly
3: battery case
4: positive electrode terminal
4': positive electrode lead
5: negative electrode terminal
5': negative electrode lead
20: energy storage unit
30: energy storage apparatus

The invention claimed is:

1. A nonaqueous electrolyte energy storage device comprising a positive electrode having a conductive substrate and a positive electrode composite layer layered on the conductive substrate, wherein:
the conductive substrate is made from an aluminum alloy containing an element other than aluminum at a content of 1% by mass or more,
the positive electrode composite layer contains particles A and particles B having different particle sizes from each other as positive active materials,
a particle size ratio (A/B) that is a ratio of a particle size of the particles A to a particle size of the particles B is 3 or more, and
the conductive substrate has a tensile strength at break of 250 MPa or more.

2. The nonaqueous electrolyte energy storage device according to claim 1, wherein:
the particle size of the particles A is larger than the particle size of the particles B, and
an amount of the particles A relative to a total amount of the particles A and the particles B is 60% by mass to 90% by mass both inclusive.

3. A method for producing a nonaqueous electrolyte energy storage device, the method comprising:
mixing particles A and particles B having different particle sizes from each other as positive active materials to produce a positive electrode composite; and
layering the positive electrode composite on a conductive substrate,
wherein the conductive substrate is made from an aluminum alloy containing an element other than aluminum at a content of 1% by mass or more and has a tensile strength at break of 250 MPa or more, and
a particle size ratio (A/B) that is a ratio of a particle size of the particles A to a particle size of the particles B is 3 or more.

4. The nonaqueous electrolyte energy storage device according to claim 1, wherein the particle size ratio (A/B) is 3 or more and 10 or less.

5. The nonaqueous electrolyte energy storage device according to claim 1, wherein the particles A and the particles B both contain a composite metal oxide containing Ni, Mn and Co.

6. The nonaqueous electrolyte energy storage device according to claim 1, wherein:
the particles A and the particles B both contain a lithium transition metal composite oxide,
a ratio of number of moles of Ni contained in the lithium transition metal composite oxide of the particles A to number of moles of transition metals contained in the lithium transition metal composite oxide of the particles A is more than 30%, and
a ratio of number of moles of Ni contained in the lithium transition metal composite oxide of the particles B to number of moles of transition metals contained in the lithium transition metal composite oxide of the particles B is more than 30%.

7. The nonaqueous electrolyte energy storage device according to claim 1, wherein the particles A and the particles B both contain a lithium transition metal composite oxide represented by a formula: $Li_wNi_xCo_yMn_{1-x-y}O_2$ ($0<w\leq1.2$, $0.3<x\leq0.8$, $0\leq y<0.7$, wherein $x+y\leq1$).

8. The nonaqueous electrolyte energy storage device according to claim 1, wherein an average thickness of the conductive substrate is 12 μm or more and 15 μm or less.

9. The nonaqueous electrolyte energy storage device according to claim 1, wherein the particle size ratio (A/B) is 4 or more.

\* \* \* \* \*